(12) United States Patent
Billingsley et al.

(10) Patent No.: US 9,757,678 B2
(45) Date of Patent: Sep. 12, 2017

(54) LAYERED OR MIXED SORBENT BED PROTECTIVE FILTRATION DEVICE

(71) Applicant: 3M INNOVATIVE PROPERTIES COMPANY, St. Paul, MN (US)

(72) Inventors: Britton G. Billingsley, St. Paul, MN (US); Larry A. Brey, Woodbury, MN (US); William Buechter, Fairfax, VA (US); Pierre Legare, Brockville (CA); Derek M. Maanum, St. Paul, MN (US); Gregory W. Peterson, Belcamp, MD (US); Joseph A. Rossin, Columbus, OH (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 675 days.

(21) Appl. No.: 14/462,727

(22) Filed: Aug. 19, 2014

(65) Prior Publication Data

US 2016/0361679 A1 Dec. 15, 2016

Related U.S. Application Data

(60) Provisional application No. 61/868,163, filed on Aug. 21, 2013.

(51) Int. Cl.
*B01D 53/04* (2006.01)
*B01J 20/06* (2006.01)
(Continued)

(52) U.S. Cl.
CPC .............. *B01D 53/04* (2013.01); *A62B 17/04* (2013.01); *A62B 18/025* (2013.01);
(Continued)

(58) Field of Classification Search
CPC ..... A62B 17/04; A62B 18/025; A62B 18/084; A62B 18/10; A62B 19/00; A62B 23/02;
(Continued)

(56) References Cited

U.S. PATENT DOCUMENTS 2,795,227 A 6/1957 Seldeen
4,284,726 A 8/1981 Shigetomi
(Continued)

FOREIGN PATENT DOCUMENTS

EP 2246110 11/2010
GB 606867 8/1948
(Continued)

OTHER PUBLICATIONS

Bandosz, Teresa J., et al.; Reactions of VX, GD, and HD with Zr(OH)4: Near Instantaneous Decontamination of VX, Journal of Physical Chemistry C, 2012, 116, pp. 11606-11614.
(Continued)

*Primary Examiner* — Frank Lawrence
(74) *Attorney, Agent, or Firm* — Ulysses John Biffoni

(57) ABSTRACT

A filtration device including a fluid-impermeable housing having a gas inlet and outlet, and containing within the housing first filter media particles of an extended surface area substrate and containing at least one metal impregnant, and second filter media particles of an extended surface area zirconium hydroxide substrate and containing zinc (hydr) oxide. The first or second filter media particles also contain an amine-functional material. The device may be used in atmospheres containing various harmful gases, and may provide particularly useful improvements in breakthrough times for nitrogen dioxide, hydrogen sulfide, ammonia and formaldehyde compared to a device containing only the first filter media particles or only the second filter media particles.

29 Claims, 5 Drawing Sheets

(51) Int. Cl.

| | |
|---|---|
| B01J 20/20 | (2006.01) |
| B01J 20/22 | (2006.01) |
| B01J 20/28 | (2006.01) |
| A62B 17/04 | (2006.01) |
| A62B 18/02 | (2006.01) |
| A62B 18/08 | (2006.01) |
| A62B 18/10 | (2006.01) |
| A62B 23/02 | (2006.01) |
| B01J 20/32 | (2006.01) |
| A62B 19/00 | (2006.01) |

(52) U.S. Cl.
CPC ............ *A62B 18/084* (2013.01); *A62B 18/10* (2013.01); *A62B 23/02* (2013.01); *B01J 20/06* (2013.01); *B01J 20/20* (2013.01); *B01J 20/22* (2013.01); *B01J 20/28016* (2013.01); *B01J 20/28057* (2013.01); *B01J 20/3204* (2013.01); *B01J 20/3236* (2013.01); *B01J 20/3265* (2013.01); *A62B 19/00* (2013.01); *B01D 2253/102* (2013.01); *B01D 2253/112* (2013.01); *B01D 2253/1124* (2013.01); *B01D 2253/20* (2013.01); *B01D 2253/25* (2013.01); *B01J 2220/62* (2013.01)

(58) Field of Classification Search
CPC .............. B01D 53/04; B01D 2253/102; B01D 2253/112; B01D 2253/1124; B01D 2253/20; B01D 2253/25; B01J 20/06; B01J 20/20; B01J 20/22; B01J 20/28016; B01J 20/28057; B01J 20/3204; B01J 20/3236; B01J 20/3265; B01J 2220/62
USPC ................. 96/108, 131, 132, 133, 153, 154; 128/205.12
See application file for complete search history.

(56) References Cited

U.S. PATENT DOCUMENTS

| | | | |
|---|---|---|---|
| 4,474,853 A | 10/1984 | Watanabe | |
| 5,062,421 A | 11/1991 | Burns | |
| 5,063,196 A | 11/1991 | Doughty | |
| 5,145,820 A | 9/1992 | Liang | |
| 5,492,882 A | 2/1996 | Doughty | |
| 5,714,126 A | 2/1998 | Frund | |
| 5,759,939 A | 6/1998 | Klabunde | |
| 5,792,720 A | 8/1998 | Ro | |
| 5,990,373 A | 11/1999 | Klabunde | |
| 6,093,236 A | 7/2000 | Klabunde | |
| 6,344,071 B1 | 2/2002 | Smith | |
| 6,673,326 B1 | 1/2004 | Rossin | |
| 6,837,917 B2 | 1/2005 | Karwacki | |
| 6,852,903 B1 | 2/2005 | Brown | |
| 6,890,373 B2 | 5/2005 | Nemoto | |
| 7,238,332 B2 | 7/2007 | Feaver | |
| 7,419,526 B2 | 9/2008 | Greer | |
| 7,585,359 B2 | 9/2009 | Witham | |
| 7,678,182 B2 | 3/2010 | Feaver | |
| 7,713,334 B1 | 5/2010 | Peterson | |
| 8,262,782 B2 | 9/2012 | Schlaechter | |
| 8,530,719 B1* | 9/2013 | Peterson | A62D 3/36 588/315 |
| 8,877,677 B1* | 11/2014 | Rossin | B01J 20/06 502/400 |
| 9,034,289 B1* | 5/2015 | Peterson | A62B 23/04 423/239.1 |
| 2003/0153457 A1 | 8/2003 | Nemoto | |
| 2005/0288181 A1* | 12/2005 | Tranter | B01J 20/0229 502/400 |
| 2006/0096911 A1 | 5/2006 | Brey | |
| 2008/0015194 A1 | 1/2008 | Errico | |
| 2010/0047142 A1 | 2/2010 | Wood | |
| 2011/0308524 A1 | 12/2011 | Brey | |
| 2012/0111335 A1 | 5/2012 | Croll | |

FOREIGN PATENT DOCUMENTS

| | | |
|---|---|---|
| GB | 865296 | 4/1961 |
| GB | 2327048 | 1/1999 |
| WO | WO 2010/074909 | 7/2010 |
| WO | WO 2012/100113 | 7/2012 |

OTHER PUBLICATIONS

Department of Army, *M61 Filter Canister Production* web information for Solicitation No. W911SR-11-R-0002, Oct. 12, 2010, obtained from the internet on Aug. 1, 2013.

Enatsky, Stanley A. et al., *Collective Protection*, Joint Program Executive Office for Chemical and Biological Defense, May 20, 2008.

Folck, Dawn, *Item Specification for Canister, Chemical-Biological Mask: M61*, U.S. Army Edgewood Chemical Biological Center, Jun. 7, 2010.

Glover, T. Grant et al., *Adsorption of Ammonia by Sulfuric Acid Treated Zirconium*, Langmuir, 2012, 28, pp. 10478-10487.

Guild Associates, Inc., *Chemical and Biological Defense*, 2013, obtained from internet on May 16, 2013, http://www.guildassociates.com/chem-bio_defense.

Guild Associates, Inc., *Material Safety Data Sheet for Product KRM-623*, (no date provided).

Karwacki, Christopher J. et al., *Air Purification Technology Overview*, Collective Protection (Col Pro) 2005 Conference, Jun. 21-23, 2005.

Mahle, John J. et al., *Role of TEDA as an Activated Carbon Impregnant for the Removal of Cyanogen Chloride from Air Streams: Synergistic Effect with* Cu(ll), Journal of Physical Chemistry C, 2010, 114, pp. 20083-20090.

MELChemicals product literature for Zirconium Hydroxide, (no date provided).

Peterson, Gregory W. et al., *Enhanced Cyanogen Chloride Removal by the Reactive Zirconium Hydroxide Substrate*, Industrial Engineering Chemistry Research, 2010, 49, pp. 11182-11187.

Peterson, Gregory W. et al., *H-ZSM-5 for the Removal of Ethylene Oxide: Effects of Water on Filtration Performance*, Industrial Engineering Chemistry Research, 2008, 47, pp. 185-191.

Peterson, Gregory W. et al., *Removal of Chlorine Gases from Streams of Air Using Reactive Zirconium Hydroxide-based Filtration Media*, Industrial Engineering Chemistry Research, 2012, 51, pp. 2675-2681.

Peterson, Gregory W. et al., *Surface Chemistry and Morphology of Zirconia Polymorphs and the influence on Sulfur Dioxide Removal*, Journal of Physical Chemistry C, 2011, 115, pp. 9644-9650.

Peterson, Gregory W. et al., *Zirconium Hydroxide as a Reactive Substrate for the Removal of Sulfur Dioxide*, Industrial Engineering Chemical Research, 2009, 48, pp. 1694-1698.

International Application PCT/US2014/051591 Search Report dated Apr. 29, 2015.

* cited by examiner

LAYERED OR MIXED SORBENT BED PROTECTIVE FILTRATION DEVICE

STATEMENT REGARDING FEDERALLY SPONSORED RESEARCH OR DEVELOPMENT

This invention was made with government support under contract number W911SR-09-C-0037 awarded by the U.S. Army Research, Development and Engineering Command (RDECOM). The government has certain rights in the invention.

TECHNICAL FIELD

This invention relates to filter media used to remove contaminants from respiratory air.

BACKGROUND

Extended surface area substrate particles, such as activated carbon, alumina, zeolites, and the like, are widely used in air filtration because of their ability to remove a wide range of contaminants from the air. The highly porous structure of these materials provides a high surface area that is very suitable for filtration purposes. In the case of activated carbon, the porosity results from controlled oxidation during the "activation" stage of manufacture.

The ability of such carbon to remove contaminants from air generally involves direct absorption and depends on molecular-scale interactions between a gaseous molecule and the carbon surface. The extent of this interaction may depend upon factors including the physical and chemical surface characteristics of the carbon, the molecular shape and size of the gaseous compound, the concentration of the gaseous compound in the gas stream to be filtered, residence time in the carbon bed, temperature, pressure, and the presence of other chemicals. As a rule of thumb, for a single contaminant, the extent of adsorption is primarily dependent on boiling point. In general, the higher the boiling point, the greater the capacity of carbon to remove the chemical.

Accordingly, unimpregnated carbon does not have a great capacity by itself for removal of lower boiling point gases (including reactive gases) or vapors from air. Treatments have been devised in which chemicals are incorporated into the carbon to provide improved contaminant removal capabilities. These treatments are generally known as "impregnation" methods, and the result of such treatment is an "impregnated" carbon.

U.S. military chemical and biological personal protective devices including the M40, M42, M50 and M51 Chemical-Biological (CB) Joint Service General Purpose Mask (JS-GPM) typically employ replaceable canister/filter assemblies filled with impregnated carbon. The canister/filter assemblies are required to provide breakthrough protection for specified minimum times against a variety of gases, as described for example in performance specification PRF-EA-C-2251 appended to Department of the Army Solicitation No. W911 SR-11-R-0002 for the M61 replaceable canister/filter assembly used in the Field M50 and Combat Vehicle M51 JSGPM. Similarly, the National Institute for Occupational Safety and Health (NIOSH) sets standards for respirators and respiratory protection from Chemical, Biological, Radiological, and Nuclear (CBRN) Agents. NIOSH CBRN standards for operational and escape type filters typically require that an approved device remove biological and other particulates, as well as a list of 10 gases selected to represent families of toxic compounds. The 10 NIOSH gases are sulfur dioxide ($SO_2$), hydrogen sulfide ($H_2S$), formaldehyde ($H_2CO$), ammonia ($NH_3$), hydrogen cyanide (HCN), cyanogen chloride (ClCN, or CK), phosgene ($COCl_2$), cyclohexane ($C_6H_{12}$), nitrogen dioxide ($NO_2$) and phosphine ($PH_3$). Typically, filters meeting U.S. military or NIOSH standards have been constructed using a carbon capable of removing all such gases, or by using layers of carbons that collectively remove all of the listed classes of compounds. Usually one of the listed gases drives the need for increased amounts of granular sorbent material. In the case of current carbon technologies, this gas is often ammonia or sulfur dioxide.

SUMMARY OF THE INVENTION

It would be highly desirable to improve the performance of current military and industrial replaceable canister/filter assemblies with respect to the protection provided against target gases. Although the applicable standards are in many cases performance standards rather than design standards, nonetheless it is desirable to minimize the overall canister/filter volume and depth. Doing so helps preserve a user's field of view and limits the overall canister/filter assembly weight and the leverage it may exert on the user's neck muscles when worn.

We have found that useful performance improvements may be obtained by replacing the current all-impregnated carbon fill in typical canister/filter assemblies with a novel filter media combination. Accordingly, the present invention provides, in one aspect, a filtration device comprising:
  a) a fluid-impermeable housing having a gas inlet and outlet; and
  b) disposed within the housing a plurality of first filter media particles comprising an extended surface area substrate comprising at least one metal impregnant, and a plurality of second filter media particles comprising an extended surface area zirconium hydroxide substrate and zinc (hydr)oxide;
wherein the first or second filter media particles further comprise an amine-functional material and silver or a silver compound.

In a preferred embodiment of such a device, the first and second filter media particles are in distinct layers, viz., as a first layer comprising a plurality of first filter media particles comprising an extended surface area substrate comprising at least one metal impregnant, and as a second layer comprising a plurality of second filter media particles comprising an extended surface area zirconium hydroxide substrate and zinc (hydr)oxide.

The present invention provides, in another aspect, a method for making a filtration device, which method comprises:
  a) providing a fluid-impermeable housing having a gas inlet and outlet;
  b) disposing in the housing a plurality of first filter media particles comprising an extended surface area substrate comprising at least one metal impregnant, and a plurality of second filter media particles comprising an extended surface area zirconium hydroxide substrate and zinc (hydr)oxide;
wherein the first or second filter media particles further comprise an amine-functional material and silver or a silver compound.

A preferred embodiment of such method involves disposing the first and second filter media particles in the housing in distinct layers, viz., as a first layer comprising a plurality of first filter media particles comprising an extended surface area substrate comprising at least one metal impregnant, and a second layer comprising a plurality of second filter media particles comprising an extended surface area zirconium hydroxide substrate and zinc (hydr)oxide.

The disclosed filtration device and method may be used for personal or collective protection, and in both military and non-military applications. For example, the disclosed method may be used to fabricate personal respiratory protection devices (including passive air purifying or nonpowered respirators, as well as powered air respirators), and to fabricate collective protection devices (including HVAC filters and vehicle filters) for buildings, tanks, tents, ships and other places where people reside, work or gather. The disclosed filtration device and method provide particularly useful improvements in breakthrough times for nitrogen dioxide, hydrogen sulfide, ammonia and formaldehyde. In a preferred embodiment, the replaceable canister/filter breakthrough times for nitrogen dioxide, hydrogen sulfide and formaldehyde are synergistically improved compared to the observed breakthrough times for a canister/filter having the same internal volume but filled only with the first filter media particles or filled only with the second filter media particles.

These and other aspects of the invention will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWING

Like reference symbols in the various figures of the drawing indicate like elements. The elements in the drawing are not necessarily to scale.

DETAILED DESCRIPTION

Figure 1:
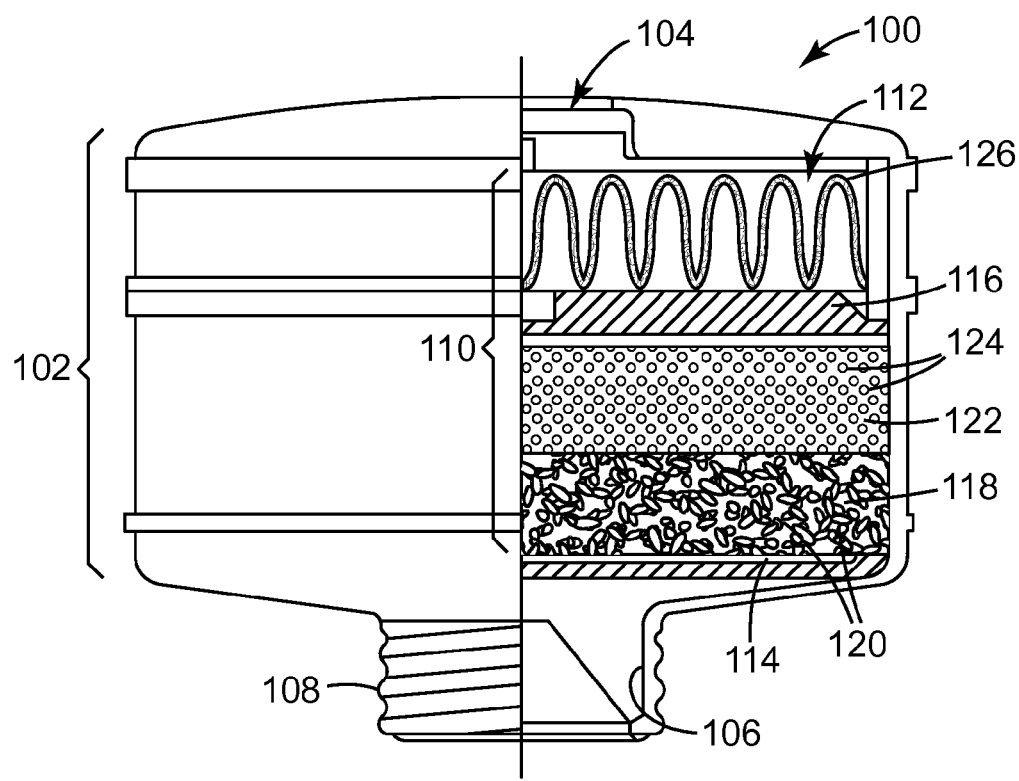
FIG. 1 is a schematic cross-sectional view of an exemplary filtration device according to the present disclosure.

The term "amine-functional material" means a material containing at least one nitrogen atom possessing a lone pair of electrons. More preferably, the term "amine-functional material" means an organic material comprising a nitrogen bound to three moieties, wherein at least one of the moieties is not hydrogen. More than one of such moieties bound to the nitrogen may be co-members of a ring structure.

The term "base" means any material that can combine with a proton (viz., a hydrogen ion) to form a new compound. Water soluble bases yield a pH greater than 7.0 in aqueous solution.

When used with respect to a particulate material, the term "extended surface area substrate" means particles whose surface, including any pores in such surface, is (preferably at a microscopic level) sufficiently large, irregular or otherwise convoluted such that the particles are capable of being impregnated with at least one metal impregnant such as an elemental metal or metal salt.

The term "filter media" means a structure (for example, a packed particle bed) or article (for example, a nonwoven web) that can be used to remove one or more contaminants from a flowing gas stream.

When used with respect to an impregnant, the term "filtering efficacy" means that filter media incorporating the impregnant have a greater capacity to remove a designated contaminant from a flowing gas stream compared to otherwise identical media that lack the impregnant. In preferred embodiments, filtering efficacy means that the impregnant is able to provide filtering protection against a designated contaminant in accordance with a desired governmental regulation, such as an applicable military standard in the U.S. or elsewhere, or an applicable non-military standard such as a NIOSH standard in the U.S., a CEN standard in Europe, or similar standards elsewhere. An impregnant may have such filtering efficacy either by itself or when used in combination with one or more other impregnant(s).

When used with respect to a housing for filter media, the term "fluid-impermeable" refers to a structure or material (other than a gas inlet or outlet for such housing) that is sufficiently impermeable to liquids and gases so as to enable satisfactory storage of such filter media prior to use without premature contamination.

When used with respect to a metal compound, the term "(hydr)oxide" refers collectively to oxides, hydroxides and oxyhydroxides of such metal. For example, the term zinc (hydr)oxide refers to zinc oxides, zinc hydroxides and zinc oxyhydroxides.

The term "impregnant" means a material used for impregnating a filter media substrate.

The term "impregnating" means causing a material or species thereof to be physically, chemically, or ionically provided on or within a filter media substrate. In some embodiments, impregnation may involve contacting a porous or textured solid with a fluid in such a manner so as to enable the fluid to penetrate the pores of the solid or coat the surface of the solid.

The term "material" means a molecular or ionic substance.

When used with respect to a filtration device, the term "porous" refers to a structure or article that is sufficiently permeable to gases so as to be useable for filtering gases entering a personal respiratory device or for filtering gases entering an area in which people reside, work or gather.

The term "species" means a chemically distinct atom, ion, molecule, radical, or other compound.

The term "substrate" means a solid (typically) or in some instances a semi-solid material, usually a solid particle or granule, that is used to support at least one chemical agent or other material used to help remove one or more contaminants from a flowing gas stream. It is preferred that the substrate also includes pores or surface texture that enhances the surface area characteristics of the substrate.

Referring to FIG. 1, a disclosed filtration device 100 is shown schematically in cross-section. Device 100 is in the form of a replaceable cartridge having a fluid-impermeable housing 102, a gas (for example, air) inlet 104, a gas (for example, air) outlet 106 in the form of a spigot equipped with a suitable mount (for example, a threaded mount) 108. Filter system 110 is disposed in the interior 112 of housing 102. Perforated retainers 114 and 116 compressively capture a packed first bed 118 containing first filter media particles 120 of an extended surface area substrate containing at least one metal impregnant, and a packed second bed 122 containing second filter media particles 124 of an extended surface area zirconium hydroxide substrate and zinc (hydr) oxide. The first filter media particles 120, second filter media particles 124 or both the first filter media particles 120 and second filter media particles 124 also contain an amine-functional material (not shown in FIG. 1). In addition, the first filter media particles 120, second filter media particles 124 or both the first filter media particles 120 and second filter media particles 124 also contain silver or a silver compound (likewise not shown in FIG. 1). Particulate filter 126 is positioned in housing 102 between retainer 116 and inlet 104. Filter 126 may for example be made from a suitable nonwoven material such as meltblown polypropylene or from a porous polymeric film, and may have a variety of configurations including a pleated filter such as in the FIG. 1 embodiment (with for example parallel or radially-arranged pleats), a flat filter or other configurations that will be familiar to persons having ordinary skill in the art. Filter 126 removes solid particulates carried through inlet 104 and prevents them from entering beds 122 or 118 or the lungs of a user. Small connected pores (not identified in FIG. 1) in beds 118 and 122 permit ambient air or other fluids to pass (for example, to flow) from inlet 104 to outlet 106 and into a personal respirator (not shown in FIG. 1). Particles 120 and 124 absorb contaminants and other potentially hazardous substances present in such fluids.

The designations "first" and "second" for beds 118 and 122 and particles 120 and 124 are used merely for convenience in labeling, and to refer to the ordinary order in which particles 120 and 124 might be added to housing 102 to form beds 118 and 122. The designations "first" and "second" accordingly do not refer to the time sequence in which flowing gases would normally contact particles 120 and 124 in the FIG. 1 embodiment, and in fact are the opposite of the actual flowing gas contact order.

Figure 2:
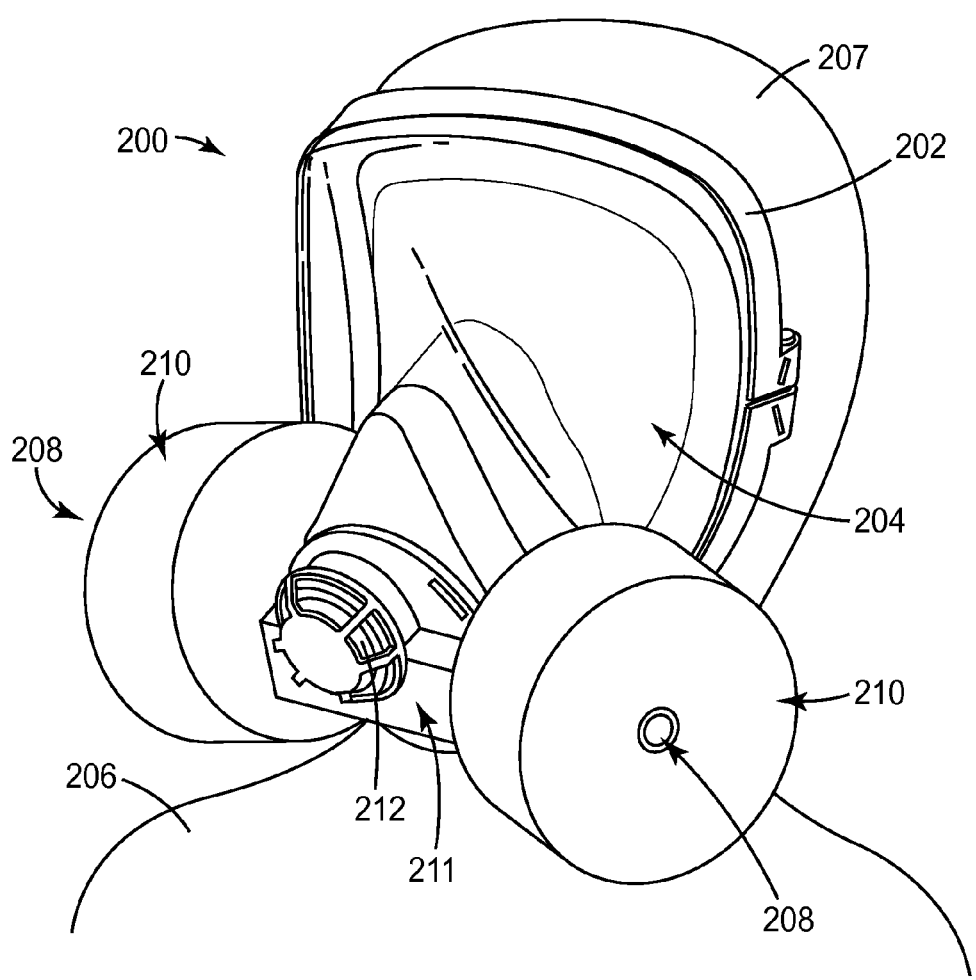
FIG. 2 is a perspective view of an exemplary personal respirator including an exemplary filtration device according to the present disclosure.

FIG. 2 illustrates a perspective view of an exemplary respiratory protection device 200, in which exemplary canister/filter assemblies according to the present disclosure may be incorporated. Device 200 has a face piece 202 with an interior portion 204 proximate at least the nose and mouth of the user 206, and a hood 207 covering the scalp and neck areas of user 206. Device 200 also has a fluid (for example, air) intake path passing through inlets 208, canister/filter assemblies 210 and manifold 211 for supplying user 206 with filtered, decontaminated air in the interior portion 204 of face piece 202. Exhaled air may be forced out of the interior portion 204 of face piece 202 through the outlet 212. The inlet 208 and outlet 212 are usually in fluid communication with each other. Respiratory protection device 200 may have a variety of configurations other than those shown in FIG. 1, for example a full face or hooded escape respirator, or a powered air purifying respirator. Further details regarding the construction of such devices will be familiar to those skilled in the art.

Figure 3:
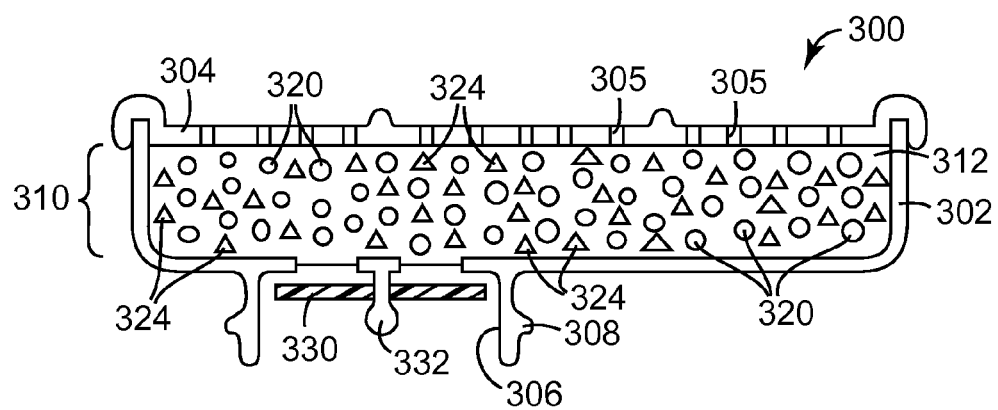
FIG. 3 is a schematic cross-sectional view of another exemplary filtration device according to the present disclosure.

FIG. 3 shows a schematic cross-sectional view of a disclosed canister/filter device 300 in the form of a replaceable cartridge having a fluid-impermeable housing 302, a perforated cover 304 whose holes 305 collectively provide a gas (for example, air) inlet, a gas (for example, air) outlet 306 in the form of a spigot equipped with a suitable mount (for example, a bayonet mount) 308. Filter system 310 in the form of a packed mixed bed of filter media particles is disposed in the interior 312 of housing 302. Housing 302 and cover 304 compressively capture bed 310, which as schematically shown in FIG. 3 contains first filter media particles 320 (indicated using circles in FIG. 3) of an extended surface area substrate containing at least one metal impregnant, evenly mixed with second filter media particles 324 (indicated using triangles in FIG. 3) of an extended surface area zirconium hydroxide substrate and zinc (hydr) oxide. The first filter media particles 320, second filter media particles 324 or both the first filter media particles 320 and second filter media particles 324 also contain an amine-functional material (not shown in FIG. 3). In addition, the first filter media particles 320, second filter media particles 324 or both the first filter media particles 320 and second filter media particles 324 also contain silver or a silver compound (likewise not shown in FIG. 3). Ambient air entering canister/filter device 300 through openings 305 will pass through filter media 320 and 324 (whereupon potentially hazardous substances in the air are absorbed or otherwise treated by filter media 320 and 324), and then will exit canister/filter device 300 via outlet 306. For the embodiment shown in FIG. 3, an optional inhalation valve 330 mounted on support 332 prevents backflow through canister/filter device 300. Backflow may be prevented using other measures that will be familiar to persons having ordinary skill in the art, such as by providing an inhalation valve or other airflow control device elsewhere upstream or downstream with respect to the normal airflow through outlet 306.

Figure 4:
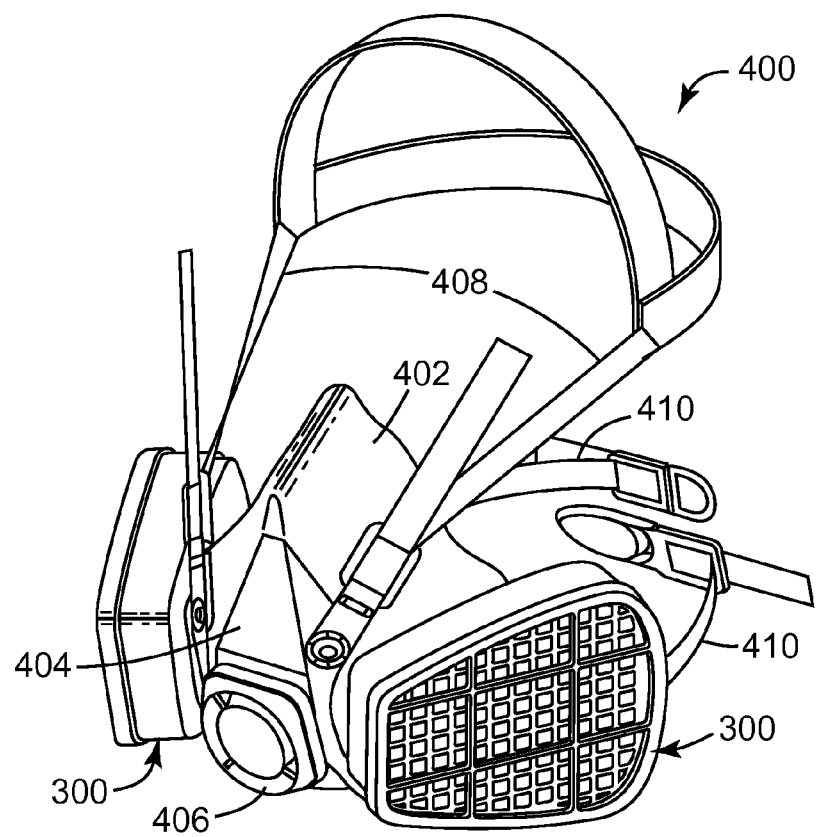
FIG. 4 is a perspective view of another exemplary personal respirator including an exemplary filtration device according to the present disclosure.

Spigot-style outlet 306 and bayonet flange 308 enable canister/filter device 300 to be replaceably attached to a respiratory protection device such the illustrative exemplary respiratory device 400 for personal protection shown in FIG. 4. Device 400 is a so-called half mask like that shown in U.S. Pat. No. 5,062,421 (Burns et al.) and U.S. Patent Application Publication No. US 2006/0096911 A1 (Brey et al. '911). Device 400 includes a soft, compliant facepiece 402 that can be insert molded around a relatively thin, rigid structural member or insert 404. Insert 404 includes exhalation valve 406 and recessed, bayonet-threaded openings (not shown in FIG. 4) for removably attaching elements 300 in the cheek regions of device 400. Adjustable headband 408 and neck straps 410 permit device 400 to be securely worn over the nose and mouth of the wearer. Further details regarding the construction of such a device will be familiar to those skilled in the art.

Figure 5:
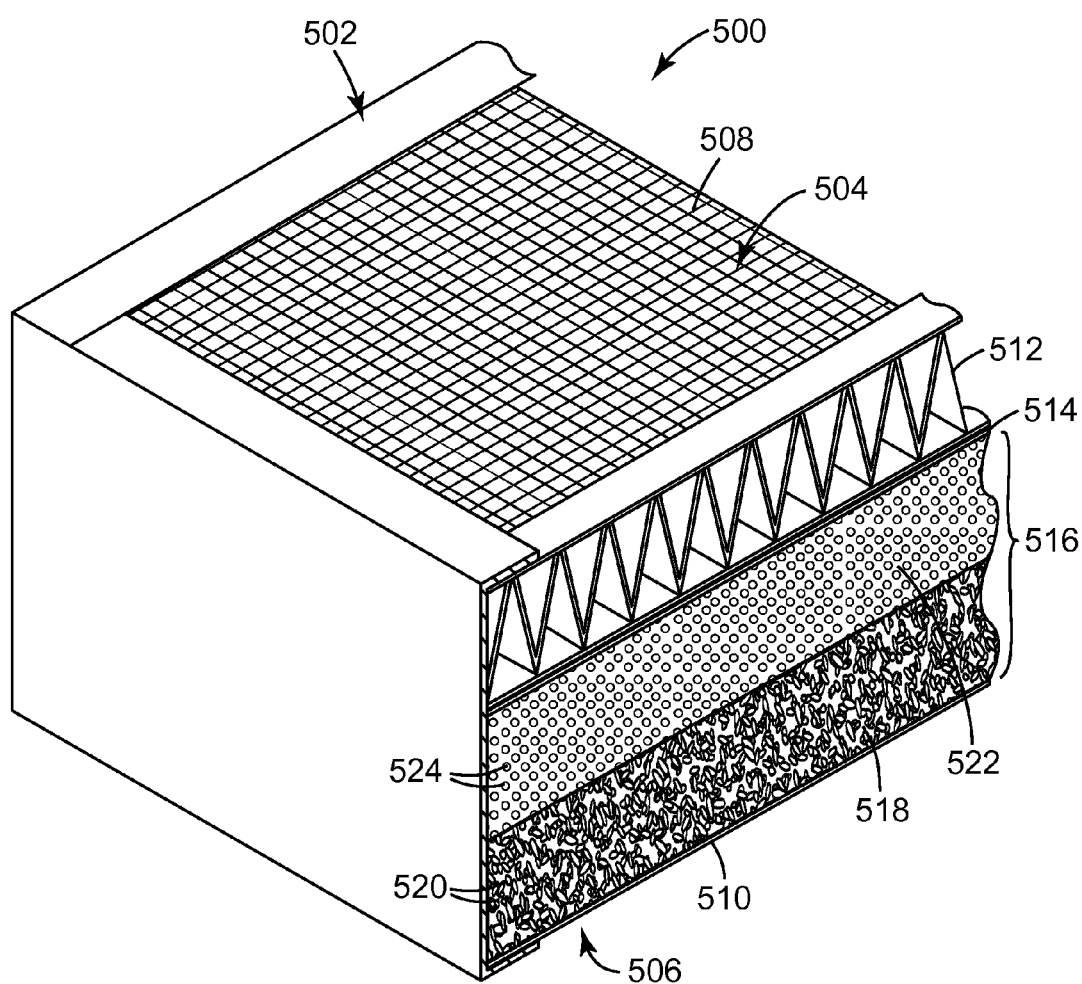
FIG. 5 is a schematic view, partially in cross-section, of an exemplary collective protection device according to the present disclosure.

FIG. 5 shows a collective protection device 500 having a housing 502, a gas inlet side 504 and gas outlet side 506 each of which is proximate a porous expanded metal support 508 or 510, a pleated particulate filter 512, internal support 514 and filter system 516 including a first bed 518 (proximate support 510) containing first filter media particles 520 of an extended surface area substrate containing at least one metal impregnant, and a second bed 522 (proximate internal support 514) containing second filter media particles 524 of an extended surface area zirconium hydroxide substrate and zinc (hydr)oxide. The first filter media particles 520, second filter media particles 524 or both the first filter media particles 520 and second filter media particles 524 also contain an amine-functional material (not shown in FIG. 5). In addition, the first filter media particles 520, second filter media particles 524 or both the first filter media particles 520 and second filter media particles 524 also contain silver or a silver compound (likewise not shown in FIG. 5). Device 500 may for example be mounted in an air handling system (for example an HVAC system) to provide particulate filtration and contaminant removal in a large interior or exterior space where people reside, work or gather.

A variety of fluid-impermeable housings may be employed in the disclosed filtration devices. The housing preferably contains the first and second filter media particles within a single enclosed interior space, with the first and second media particles or first and second beds thereof contacting one another within that space in a packed or at least lightly compressed configuration. The housing may also contain within such space one or more containing bodies, retaining plates, liners, compression pads, scrims or other elements that help maintain the first and second media particles or first and second beds thereof in such packed or at least lightly compressed configuration. When the first and second media particles are respectively contained within first and second beds, the beds may contact one another within the housing or may be separated by a low flow resistance porous separator or other element that itself contacts the first and second beds. Exemplary housings may be made of thermoplastic or thermoset polymers or copolymers including polyamides, polystyrenes, acrylonitrile-butadiene-styrene (ABS) copolymers, polyolefins and polyesters; elastomeric materials including rubber; metals including steel and aluminum; appropriately coated paper or coated cardboard; combinations thereof; and other materials that will be familiar to persons having ordinary skill in the art. The gas inlet and gas outlet likewise will be familiar to persons having ordinary skill in the art, with the gas outlet design or housing frequently including an appropriate locking mount or other device to facilitate rapid and reliable canister/filter mounting, demounting and replacement. The housing preferably is permanently assembled using tamper-proof construction such as adhesives, welding or other techniques that would require destruction of the assembled housing in order to access the first and second filter media particles contained therein. Further details regarding suitable housings will be familiar to persons having ordinary skill in the art.

A variety of first filter media particles may be employed. Representative examples of such particles include activated carbon, zeolites, alumina, silica, catalyst supports, combinations of these, and the like. Exemplary first filter media particles preferably have a surface area of at least about 30 $m^2/g$, more typically at least about 500 $m^2/g$ to 2000 $m^2/g$, and most preferably about 900 $m^2/g$ to about 1500 $m^2/g$ as measured using the Brunauer-Emmett-Teller (BET) method and the procedure described in ISO 9277:1995. The first filter media particles may have any of a wide range of particle sizes, and generally will be expressed in terms of a minimum mesh size, maximum mesh size or range of mesh sizes. A typical expression for a range of mesh sizes will be given by "a×b", wherein "a" refers to a mesh density through which substantially all of the particles would fall through, and "b" refers to a mesh density that is sufficiently high so as to retain substantially all of the particles. For example, a mesh size of 12×30 means that substantially all of the particles would fall through a mesh having a mesh density of 12 wires per inch, and substantially all of the particles would be retained by a mesh density having a density of 30 wires per inch. Filter particles characterized by a mesh size of 12×30 would include a population of particles having a diameter in the range from about 0.5 mm to about 1.5 mm.

Selecting an appropriate mesh size for the substrate particles involves balancing density and filter capacity against air flow resistance. Generally, a finer mesh size (for example, smaller particles) tends to provide greater filter media utilization, but higher air flow resistance. Balancing these concerns, "a" is typically in the range of 5 to 20 and "b" is typically 15 to about 40 with the proviso that the difference between a and b is generally in the range from about 5 to about 30. Specific mesh size ranges may for example include 12×20, 12×30, and 12×40.

The first filter media particles incorporate at least one metal impregnant. Suitable impregnating agents include metals, metal salts and other metal compounds that will provide a desired metal impregnant (preferably, a metal or metal (hydr)oxide) in the first filter media particles. Exemplary impregnating agents include metals or metal compounds containing Cu, Zn, Mo, Ag, Ni, V, W, Co, Mn, I combinations thereof, and the like. Potentially carcinogenic metal impregnants (for example, Cr(VI) oxide, containing the hexavalent form of Cr) or metal impregnants in other valence states that potentially could be converted to potentially carcinogenic metal impregnants (for example, Cr(III) oxide, containing the trivalent form of Cr) preferably are not present in detectable amounts. The impregnants may be in metallic form, but more typically are impregnated as salts, oxides, carbonates and the like.

Selection of a particular metal impregnant or mixtures of metal impregnants will depend upon the desired range of filtering capabilities inasmuch as each of the various metal impregnants may tend to provide protection against particular air contaminants. For example, Cu compounds tend to help filter many gases such as HCN, $H_2S$, acid gases, and the like from air streams. The disclosed first filter media particles accordingly may include about 0.1 to about 15 wt. % of one or more copper-containing impregnants, based upon the total weight of the impregnated particles. This same basis (weight of impregnant based upon the total weight of the impregnated particles) will be used for the other impregnant weight discussions set out below. As a further example, Mo, V and W impregnants help to filter gases such as hydrogen cyanide from air streams when used in combination with a Cu impregnant. The disclosed first filter media particles accordingly may for example also include about 0.1 to about 10 wt. % of one or more impregnants such as Mo, V or W.

Zn in various forms tends to help filter HCN, cyanogen and $NH_3$ from air streams. The disclosed first filter media particles accordingly may include about 1 to about 20 wt. % of one or more impregnants including Zn.

Ag tends to help filter arsenical gases from an air stream. Ag functions catalytically and generally is not consumed during filtering operations. Accordingly, the disclosed first filter media particles may include relatively small catalytic amounts, for example, about 0.01 to 1, preferably 0.1 wt. %, of one or more Ag-containing impregnants.

Ni and Co impregnants each independently help to filter HCN from air streams. The disclosed first filter media particles accordingly may include about 0.1 to about 15 wt. % of one or more Ni-containing impregnants or Co-containing impregnants.

In addition to the above-mentioned metal impregnants, the disclosed first filter media particles may optionally include one or more other kinds of impregnants. For example, ammonia or ammonium salts in the impregnating solution not only help to improve the solubility of a metal, metal compound or precursor thereof during the manufacture of the first filter media particles, but the remaining adsorbed quantities of such salts may also help to remove acid gases from air streams. Sulfate salts are believed to help to control pH during filter media usage. Ammonium sulfate, for instance, when impregnated on a substrate such as carbon and dried at 145° C. forms an acid sulfate. Acid sulfate is sufficiently acidic to react with ammonia to facilitate removal of ammonia from a flow of air or other gas. Through impregnation and drying, strongly acidic ammonium salts may impregnate carbon during the drying process without damaging other (for example, more basic) impregnants being formed. This may provide enhanced ammonia service life in canister/filters containing the resultant impregnated carbon. The disclosed first filter media particles accordingly may include about 0.1 to about 10, and preferably about 2.5 to about 4.5 wt. % sulfate.

Moisture beneficially helps to remove acid gases from air streams. The disclosed first filter media particles accordingly may include up to about 15 wt. %, and preferably about 3 to about 12 wt. % of water.

Impregnants may be incorporated into the first filter media particles using techniques that will be familiar to persons having ordinary skill in the art. Impregnants typically are impregnated via solution processing, sublimation processing, fluidized bed processing, and the like. Representative techniques for such processing are for example described in U.S. Pat. No. 5,063,196 (Doughty et al. '196), U.S. Pat. No. 5,145,820 (Liang et al.), U.S. Pat. No. 5,492,882 (Doughty et al. '882), U.S. Pat. No. 5,792,720 (Ro et al.) and U.S. Pat. No. 6,344,071 B1 (Smith et al.), in U.S. Patent Application Publication Nos. US 2010/0047142 A1 (Wood et al.) and US 2011/0308524 A1 (Brey et al. '524), in International Published Application No. WO 2012/100113 A1 (Scott Technologies, Inc.), and in Mahle et al., "Role of TEDA as an Activated Carbon Impregnant for the Removal of Cyanogen Chloride from Air Streams: Synergistic Effect with Cu(II)", J. Phys. Chem. C., 114, pp. 20083-20090 (2010). Typically the impregnant will be adsorbed or otherwise deposited onto the first filter media particle substrate and accordingly will not be present in the first filter media particles as a discrete separate particle.

As noted above, the first or second filter media particles contain an amine-functional material. Preferably at least the first filter media particles contain such a material, and more preferably both the first and second filter media particles contain such a material. Amines may remove or help remove gases such as cyanogen chloride (CK), methyl bromide and methyl iodide from air streams. A wide range of amine-functional materials may be beneficially incorporated into the first filter media particles. Suitable amines may be monomeric, oligomeric, or polymeric. Preferred amines are solids or liquids at room temperature, and include triethylenediamine (TEDA), triethylamine (TEA), quinuclidine (QUIN), pyridine, pyridine carboxylic acids such as pyridine-4-carboxylic acid (P4CA), combinations of these, and the like. TEDA is particularly preferred.

The amount of incorporated amine may vary within a wide range. Generally, if too little is used, the CK lifetime of the resultant media may be below the desired breakthrough time. Above some impregnation level, little additional benefit may be observed by the use of more amine. Balancing these concerns, the first filter media particles preferably contain about 0.5 to about 15, more preferably about 1 to about 10, and most preferably about 1 to about 5 wt. % of amine-functional material based upon the total weight of the first filter media particles. Representative techniques for incorporating amines into the first filter media particles are described, for example in the above-mentioned in Doughty et al. '196, Liang et al., Doughty et al. '882, Ro et al., Smith et al., Wood et al., Brey et al. '524 and Scott Technologies, Inc. patents or patent applications, and in the Mahle et al. article.

As also noted above, the first or second filter media particles contain silver or a silver compound. Preferably at least the first filter media particles contain silver or a silver compound, and more preferably both the first and second filter media particles contain silver or a silver compound. Inclusion of silver or a silver compound (for example, silver oxide) in the first filter media particles may help filter arsenical gases from an air stream. Silver functions catalytically and generally is not consumed during filtering operations. Accordingly, the first filter media particles preferably include relatively small catalytic amounts, for example, about 0.01 to 1, preferably 0.1 wt. %, of one or more Au-containing impregnants.

For broad spectrum filtering performance, the first filter media particles preferably include activated carbon. In a preferred embodiment, the first filter media particles include an activated carbon substrate impregnated with about 6 to about 13 wt. % of a Cu-containing impregnant, 0 to about 10 wt. % of a Zn-containing impregnant, about 1 to about 4 wt. % of a Mo-containing impregnant, about 1 to about 5 wt. % of an amine-functional material and about 0.01 to 1 wt. %, of one or more Ag-containing impregnants. Further preferred first filter media particles include an activated carbon substrate impregnated with Cu-, Zn- and Mo-containing impregnants, an amine-functional material and an Ag-containing impregnant, and also including about 2.5 to about 4.5 wt. % sulfate salt, or about 1 to about 25 wt. % water. Another class of preferred first filter media particles includes an activated carbon substrate impregnated with about 1 to about 10 wt. % of a zinc-containing impregnant (for example, $ZnCl_2$) and optionally moisture in the range of about 1 to about 15, and preferably about 9 to about 12 wt. %, together with about 1 to about 5 wt. % of an amine-functional material and 0.1 to about 1 wt. % of an Ag-containing impregnant.

A number of commercially available materials may be employed as or modified to make the first filter media particles. Exemplary such materials include CALGON™ Universal Respirator Carbon (URC) particles and CALGON "ASZM-TEDA" particles from Calgon Carbon Corporation. An activated carbon impregnated only with TEDA such as PICA™ NACAR-B from the Pica Division of Jacobi Carbon Company may also be employed as an adjuvant to the first filter media particles, or as a starting material for making the first filter media particles. Similarly, an unimpregnated activated carbon such as the coconut carbon available as 12×20 mesh KURARAY™ GG carbon from Kuraray Chemical Company Ltd. may also be employed as an adjuvant to the first filter media particles, or as a starting material for making the first filter media particles.

A variety of second filter media particles may be employed. Exemplary second filter media particles preferably have a surface area of at least about 30 $m^2/g$, more typically about 100 $m^2/g$ to about 600 $m^2/g$, and most preferably about 200 $m^2/g$ to about 500 $m^2/g$ as measured using the above-mentioned BET method. The zirconium hydroxide substrate in the second filter media particles typically will be amorphous as determined using for example x-ray crystallography. The second filter media particle surface area may be altered using calcining and other techniques that will be familiar to persons having ordinary skill in the art. Calcination at higher temperatures (for example, temperatures of 350° C. and above in air) may cause loss of hydroxyl groups and at least partial conversion of zirconium hydroxide to crystalline zirconium oxide.

The second filter media particles may have any of a wide range of particle sizes, and may for example have average particle diameters of about 1 to about 50 micrometers or about 1 to about 10 micrometers. The second filter media particle sizes may also be expressed in terms of a minimum mesh size, maximum mesh size or range of mesh sizes as discussed above in connection with the first filter media particles.

A number of commercially available materials may be employed as or modified to make the second filter media particles. Exemplary expanded surface area zirconium hydroxide particles include those available from Guild Associates (for example as ZARBON™ molecular filtration media), from Sigma Aldrich Co. (for example, as Product No. 464171) and from MEL Chemicals, Inc. (for example as Product Nos. XZO 631, XZO 880, XZO 1247, XZO 1501/03, XZO 1501/06 and XZO 1501/09). A variety of doped zirconium hydroxides may also be employed, such as the various XZO series zirconium hydroxides doped with hydroxides or oxides of Ce, La, Y, Nd, Pr, Ti, Al, Si, S or W commercially available from MEL Chemicals, Inc., and the various zirconium hydroxides doped with hydroxides or oxides of Fe, Cu, Mg, Mn, Gd, Cs, Na, K, B, Nb, Li or Sn that are experimentally available from MEL Chemicals, Inc. Further information regarding expanded surface area zirconium hydroxide particles may be found for example in Peterson et al., "Zirconium Hydroxide as a Reactive Substrate for the Removal of Sulfur Dioxide", Ind. Eng. Chem. Res., 48, pp. 1694-98 (2009); Peterson et al., "Enhanced Cyanogen Chloride Removal by the Reactive Zirconium Hydroxide Substrate", Ind. Eng. Chem. Res., 49, pp. 11182-87; Peterson et al., "Surface Chemistry and Morphology of Zirconia Polymorphs and the Influence on Sulfur Dioxide Removal", J. Phys. Chem. C., 115, pp. 9644-50 (2011); Peterson et al., "Removal of Chlorine Gases from Streams of Air Using Reactive Zirconium Hydroxide-based Filtration Media", Ind. Eng. Chem. Res., 51, pp. 2675-81 (2012); Bandosz et al., "Reactions of VX, GD, and HD with $Zr(OH)_4$: Near Instantaneous Decontamination of VX", J. Phys. Chem. C., 116, pp. 11606-14 (2012); and in copending U.S. patent application Ser. No. 12/914,334 filed Oct. 28, 2010.

The second filter media particles also include zinc (hydr)oxide. Inclusion of zinc (hydr)oxide in the second filter media particles may help filter HCN, cyanogen and $NH_3$ from air streams. Zinc (hydr)oxide may be added to the second filter media particles using conventional particle mixing techniques, or formed in the second filter media particles using impregnation techniques like those discussed above in connection with the first filter media particles. The disclosed second filter media particles preferably include about 1 to about 20 wt. % Zn (hydr)oxide.

As noted above, the first or second filter media particles contain an amine-functional material. Exemplary amine-functional materials for use in the second filter media particles include those discussed above in connection with the first filter media particles. Techniques for adding amine-functional materials to the second filter media particles are described, for example, in the above-mentioned Peterson et al. papers entitled "Enhanced Cyanogen Chloride Removal by the Reactive Zirconium Hydroxide Substrate" and "Removal of Chlorine Gases from Streams of Air Using Reactive Zirconium Hydroxide-based Filtration Media". Preferred amine-functional materials and amounts include those discussed above in connection with the first filter media particles. For example, the second filter media particles preferably include about 1 to about 5 wt. % of an amine-functional material, with TEDA being a particularly preferred amine.

As also noted above, the first or second filter media particles contain silver or a silver compound. Inclusion of silver or a silver compound (for example, silver oxide) in the second filter media particles may help filter arsenical gases from an air stream. Silver or silver compounds may be added to the second filter media particles using conventional particle mixing techniques, or formed in the second filter media particles using impregnation techniques like those discussed above in connection with the first filter media particles. The second filter media particles may include relatively small silver amounts, for example, about 0.01 to 1 wt. % Ag.

The disclosed second filter media particles may contain additional impregnants including those discussed above in connection with the first filter media particles. Preferred amounts of such additional impregnants may be determined empirically, and as a starting point will be similar to the corresponding preferred amounts recited above in connection with the first filter media particles.

The disclosed first and second filter media particles may if desired contain adjuvants other than the first and second filter media particles. Exemplary such adjuvants include untreated carbon, untreated zirconium hydroxide, acidic adsorbents, acid-impregnated adsorbents, the catalysts and other filtering agents described in the above-mentioned Wood et al. application, the Mg or Ca-containing layers described in the above-mentioned Scott Technologies, Inc. application, and other materials that will be familiar to persons having ordinary skill in the art.

The first and second filter media particles may be combined within the housing in a variety of relative ratios. In general, the chosen ratio may be empirically selected based at least in part on the expected gas or gases that may be found in an atmosphere in which the disclosed canister/filter may be employed. Suitable weight ratios for the first and second filter media particles may for example range from about 80:20 to about 10:90, from about 70:30 to about 20:80, from about 60:40 to about 30:70 or from about 30:70 to about 40:60 based on the respective first and second filter media particle weights. When the first and second filter media particles are present in separate beds, suitable volume ratios (and in the case of equal cross-sectional area beds, depth ratios) for the first to second beds may for example range from about 90:10 to about 10:90, from about 80:20 to about 20:80, from about 70:30 to about 30:70 or from about 60:40 to about 40:60 based on the respective first and second bed volumes or bed depths. Additional beds (for example, a third or fourth bed) may be employed as needed for particular applications, and in such cases the bed ratios mentioned above may be adjusted empirically as needed.

The disclosed beds may have a variety of configurations, shapes and sizes. For example, in canister/filters for use in a personal protection device, the beds may be generally planar as shown for example in FIG. 1, or curved as shown for example in U.S. Pat. No. 8,262,782 B2 (Schlaechter). The overall volume of the first and second filter beds in a single replaceable personal protection device canister/filter may for example range from about 10 to about 1,000 $cm^3$, from about 25 to about 750 $cm^3$, or from about 50 to about 500 $cm^3$, with larger volumes typically being more appropriate for powered air purifying respirators or other devices in which the canister/filter is remotely located with respect to the user's breathing passages (for example, near the user's belt) and smaller volumes typically being more appropriate for unpowered respirators or other devices in which the canister/filter is located near the user's breathing passages (for example, near the user's cheek area). For replaceable canister/filters devices designed for use in collective protection devices, the shape and thickness of the bed(s), the bed ratios (for devices having more than one bed), and the device and bed(s) volume may vary widely, depending on the chosen application.

The disclosed canister/filters may be assembled using methods known to persons having ordinary skill in the art. Mixtures or beds of the first and second filter media particles may for example be placed in the housing using snowstorm filling as described in UK Patent No. 606,867 (Harris), or using vibrational filling as described in the above-mentioned Schlaechter patent. The housing may include a particulate filter like that shown in FIG. 1 or may be designed to mate with detachable particulate filters that will be familiar to persons having ordinary skill in the art. As discussed above, mixtures or beds of the first and second filter media particles may be retained within the housing using appropriate structural components including, but not limited to, containing bodies, retaining plates, liners, compression pads, scrims and the like.

The invention will now be described with reference to the following non-limiting examples, in which all parts and percentages are by weight unless otherwise indicated.

EXAMPLE 1

Two-piece canister/filter housings having a gas inlet, a gas outlet, and a mount designed to mate with a test rig were molded in top and bottom portions from a thermoplastic resin. The bottom portion included the gas outlet and mount, and the top portion included the gas inlet. Internal porous first and second compression plates shaped to fit snugly inside the housing bottom portion were likewise molded from thermoplastic resin. A first compression plate was inserted in each housing bottom, followed by addition via snowstorm filling of a layered filter media particle bed or beds as shown below in Table 1. The second compression plate was next inserted in each housing bottom, followed by a pleated nonwoven polypropylene particulate filter positioned between the second compression plate and housing top portion. The canister/filter top and bottom portions were tightly closed to compress the filter media particle bed(s) and permanently bonded together. The bed(s) had an overall volume after compression of about 85 cm$^3$. Run No. 1 employed a single filter bed made entirely from CALGON ASZM-TEDA impregnated carbon particles from Calgon Carbon Corporation, believed to be the same carbon used in the above-mentioned M61 canister/filter housings. Run No. 2 employed a single filter bed made entirely from "Co-ZZT" particles from Guild Associates containing 70-95 wt. % zirconium hydroxide, 10-30 wt. % zinc hydroxide, 0-15 wt. % water, up to 10 wt. % TEDA and 1-5 wt. % cobalt hydroxide. Run No. 3 employed a first filter bed of 26.64 g CALGON ASZM-TEDA impregnated carbon particles nearest the gas outlet, and a second filter bed of 53.92 g Co-ZZT zirconium hydroxide particles filled atop the carbon particle bed (viz., between the carbon particle bed and the gas inlet). This corresponded to a 33:67 weight ratio of the first and second filter particles, and a 50:50 by volume (or by depth) ratio of the first and second beds before compression.

TABLE 1

| Run No. | Filter Media Particles |
|---|---|
| 1 | Single Layer of ASZM-TEDA impregnated carbon particles |
| 2 | Single Layer of Co-ZZT zirconium hydroxide particles |
| 3 | First Layer of ASZM-TEDA impregnated carbon particles and Second Layer of Co-ZZT zirconium hydroxide particles |

The assembled canister/filter devices were evaluated at the Edgewood Chemical Biological Center, Aberdeen Proving Ground, Md. against 11 target gases to determine breakthrough times in accordance with the above-mentioned performance specification PRF-EA-C-2251. The results were normalized by assigning a value of "1" to the breakthrough time for each individual gas in Run No. 1, and reported based on the relative breakthrough time for each individual gas in Run No. 2 and Run No. 3 compared to the Run No. 1 breakthrough times. The results are set out below in Table 2 and shown graphically in FIG. 6, where the breakthrough gases are identified as CK (cyanogen chloride), AC (hydrogen cyanide), NCCN (cyanogens), Cl2 (chlorine), NO2 (nitrogen dioxide), H2S (hydrogen sulfide), SO2 (sulfur dioxide), NH3 (ammonia), DMMP (dimethyl methyl phosphonate), SA (arsine) and H2CO (formaldehyde). AC (hydrogen cyanide) and cyanogen breakthrough times were measured when the device was challenged with AC, and the other gases were evaluated individually.

TABLE 2

| Run No. | CK | AC | NCCN | Cl2 | NO2 | H2S | SO2 | NH3 | DMMP | SA | H2CO |
|---|---|---|---|---|---|---|---|---|---|---|---|
| 1 (ASZM-TEDA) | 1 | 1 | 1 | 1 | 1 | 1 | 1 | 1 | 1 | 1 | 1 |
| 2 (Co-ZZT) | 1.556 | 2.318 | No Break | 0.985 | 4.254 | 1.311 | 2.013 | 2.084 | 0.309 | 0 | 1.987 |
| 3 (50:50 ASZM-TEDA:Co-ZZT) | 1.321 | 1.716 | 1.824 | 0.914 | 9.018 | 1.573 | 1.573 | 1.699 | 0.875 | 0.104 | 2.137 |

Figure 6:
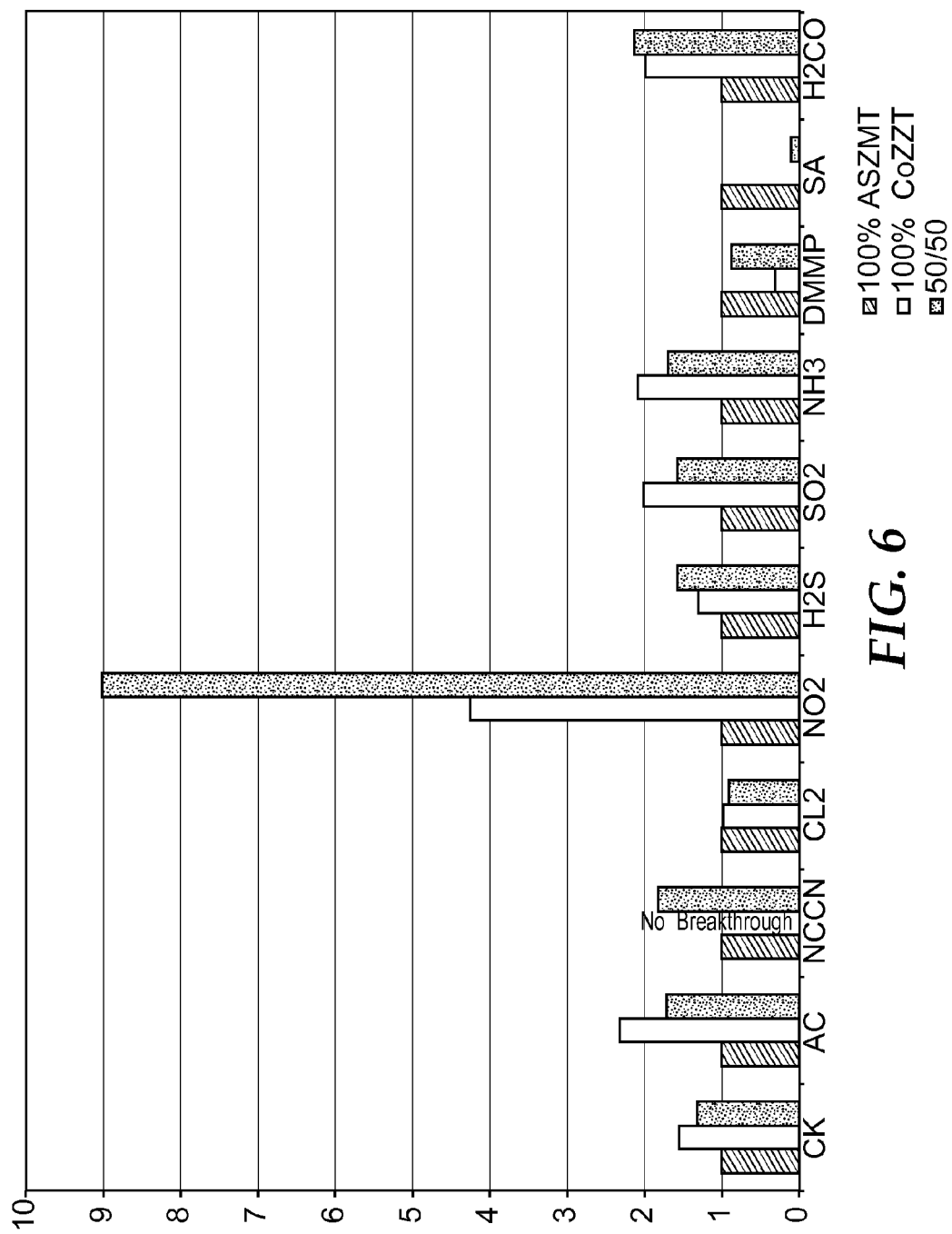
FIG. 6 is a graph comparing the performance against several target gases of canister/filter housings filled only with the first filter media particles, filled only with the second filter media particles or filled with equal-depth layers (before compression) of the first and second filter media particles.

As shown in Table 2 and FIG. 6, the Run No. 3 filtration device provided generally comparable or improved and in some cases significantly improved breakthrough times for most gases compared to the all-carbon filtration device used in Run No. 1. Synergistic improvements in nitrogen dioxide, hydrogen sulfide and formaldehyde performance were obtained compared to the all-carbon filtration device used in Run No. 1 and the all-zirconium hydroxide filtration device used in Run No. 2. Reduced performance was observed against arsine, but this could be ameliorated or eliminated by adding additional silver to the carbon layer or zirconium hydroxide layer.

Various modifications and alterations of this invention will be apparent to those skilled in the art without departing from this invention. This invention should not be restricted to that which has been set forth herein only for illustrative purposes. The complete disclosure of all listed patents, patent documents and publications (including material safety data sheets, technical data sheets and product brochures for the raw materials and ingredients used in the Examples) are incorporated herein by reference as if individually incorporated.

We claim:

1. A filtration device comprising:
    a) a fluid-impermeable housing having a gas inlet and outlet; and
    b) disposed within the housing a plurality of first filter media particles comprising an extended surface area substrate comprising at least one metal impregnant, and a plurality of second filter media particles comprising an extended surface area zirconium hydroxide substrate and zinc (hydr)oxide;
wherein the first or second filter media particles further comprise an amine-functional material and silver or a silver compound.

2. A device according to claim 1 wherein the first and second filter media particles are disposed in the housing in distinct first and second layers.

3. A device according to claim 2 wherein the first and second layers contact one another.

4. A device according to claim 1 wherein the first and second filter media particles are disposed in the housing in a mixed layer containing the first and second filter media particles.

5. A device according to claim 1 wherein the first filter media particles comprise impregnated carbon.

6. A device according to claim 1 wherein the second filter media particles comprise zinc oxide.

7. A device according to claim 1 wherein the second filter media particles comprise zinc hydroxide.

8. A device according to claim 1 wherein the second filter media particles further comprise one or more cobalt compounds.

9. A device according to claim 1 wherein both the first and second filter media particles comprise an amine-functional material.

10. A device according to claim 1 wherein the amine-functional material comprises triethylenediamine.

11. A device according to claim 1 wherein both the first and second filter media particles comprise silver or a silver compound.

12. A device according to claim 1 wherein the first and second filter media particles are in an 80:20 to 10:90 weight ratio.

13. A device according to claim 1 wherein the first and second filter media particles are in a 60:40 to 30:70 weight ratio, the first and second filter media particles each include about 1 to about 5 wt. % of an amine-functional material, and the first or second filter media particles include about 0.01 to about 1 wt. % silver or a silver compound.

14. A personal respiratory protection device comprising a respirator and at least one filtration device according to claim 1.

15. A personal respiratory protection device according to claim 14 wherein the respirator comprises a passive air purifying or nonpowered respirator.

16. A collective protection device comprising a filtration device according to claim 1.

17. A method for making a filtration device, which method comprises:
    a) providing a fluid-impermeable housing having a gas inlet and outlet;
    b) disposing in the housing a plurality of first filter media particles comprising an extended surface area substrate comprising at least one metal impregnant, and a plurality of second filter media particles comprising an extended surface area zirconium hydroxide substrate and zinc (hydr)oxide;
wherein the first or second filter media particles further comprise an amine-functional material and silver or a silver compound.

18. A method according to claim 17 comprising disposing the first and second filter media particles in the housing in distinct first and second layers.

19. A method according to claim 18 wherein the first and second layers contact one another.

20. A method according to claim 17 comprising disposing the first and second filter media particles in the housing in a mixed layer containing the first and second filter media particles.

21. A method according to claim 17 wherein the first filter media particles comprise impregnated carbon.

22. A method according to claim 17 wherein the second filter media particles comprise zinc oxide.

23. A method according to claim 17 wherein the second filter media particles comprise zinc hydroxide.

24. A method according to claim 17 wherein the second filter media particles further comprise one or more cobalt compounds.

25. A method according to claim 17 wherein both the first and second filter media particles comprise an amine-functional material.

26. A method according to claim 17 wherein the amine-functional material comprises triethylenediamine.

27. A method according to claim 17 wherein both the first and second filter media particles comprise silver or a silver compound.

28. A method according to claim 17 wherein the first and second filter media particles are in an 80:20 to 10:90 weight ratio.

29. A method according to claim 17 wherein the first and second filter media particles are in a 60:40 to 30:70 weight ratio, the first and second filter media particles each include about 1 to about 5 wt. % of an amine-functional material, and the first or second filter media particles include about 0.01 to about 1 wt. % silver or a silver compound.

* * * * *